US010596497B2

(12) United States Patent
Backman et al.

(10) Patent No.: US 10,596,497 B2
(45) Date of Patent: Mar. 24, 2020

(54) FILTER SCRAPER

(71) Applicant: TRANSOR FILTER USA, L.L.C., Elk Grove Village, IL (US)

(72) Inventors: Sune V. Backman, Schaumburg, IL (US); Irvin L. Kaage, III, Park Ridge, IL (US)

(73) Assignees: Sune V. Backman, Schaumburg, IL (US); Irvin L. Kaage, III, Park Ridge, IL (US)

( * ) Notice: Subject to any disclaimer, the term of this patent is extended or adjusted under 35 U.S.C. 154(b) by 0 days.

(21) Appl. No.: 15/964,936

(22) Filed: Apr. 27, 2018

(65) Prior Publication Data

US 2019/0329165 A1 Oct. 31, 2019

(51) Int. Cl.
*B01D 29/33* (2006.01)
*B01D 29/31* (2006.01)
*B01D 33/46* (2006.01)
*B01D 33/073* (2006.01)
*B01D 29/52* (2006.01)

(52) U.S. Cl.
CPC ............ B01D 33/466 (2013.01); *B01D 29/52* (2013.01); *B01D 33/073* (2013.01)

(58) Field of Classification Search
CPC ............ B01D 2201/082; B01D 29/682; B01D 29/39; B01D 29/66; B01D 29/68; B01D 29/688; B01D 33/21; B01D 2201/0415; B01D 2201/0438; B01D 2239/0654; B01D 25/327; B01D 29/035; B01D 29/114; B01D 29/23; B01D 29/41; B01D 29/52; B01D 29/684; B01D 29/705; B01D 29/78; B01D 29/908
See application file for complete search history.

(56) References Cited

U.S. PATENT DOCUMENTS

| 2,689,020 | A | * | 9/1954 | Hersey, Jr. ......... B01D 46/0071 210/405 |
| 4,219,423 | A | | 8/1980 | Smith, Jr. |
| 4,220,540 | A | | 9/1980 | Hagihara |
| 5,061,366 | A | | 10/1991 | Arai |
| 5,154,825 | A | | 10/1992 | Kupka |
| 6,378,705 | B1 | | 4/2002 | Bacher et al. |
| 2004/0049905 | A1 | * | 3/2004 | Jansch ................. E21B 19/164 29/428 |
| 2013/0105415 | A1 | * | 5/2013 | Xia ....................... B01D 29/39 210/791 |

FOREIGN PATENT DOCUMENTS

WO WO 2015/092152 A1 6/2015

* cited by examiner

*Primary Examiner* — Dirk R Bass
(74) *Attorney, Agent, or Firm* — Pauley Erickson & Kottis

(57) ABSTRACT

A filter apparatus and method for cleaning filter elements. The filter elements, each including a filter body with an external surface enclosing a filter passage, extend along a longitudinal axis of a vessel housing. A scraper element is disposed about the external surface of each filter body and travels along the longitudinal length of the filter body via a rotational screw to remove deposits. A lower air inlet is included on the vessel to loosen deposits on the filter surfaces, such as during or prior to scraping.

18 Claims, 3 Drawing Sheets

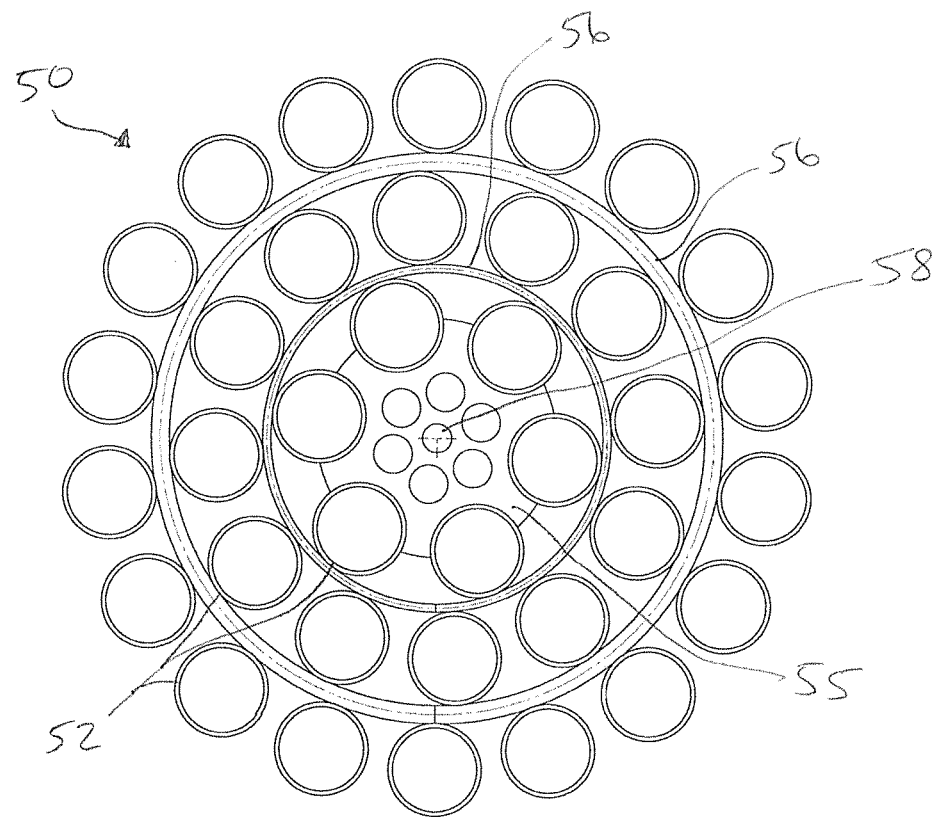
FIG. 5
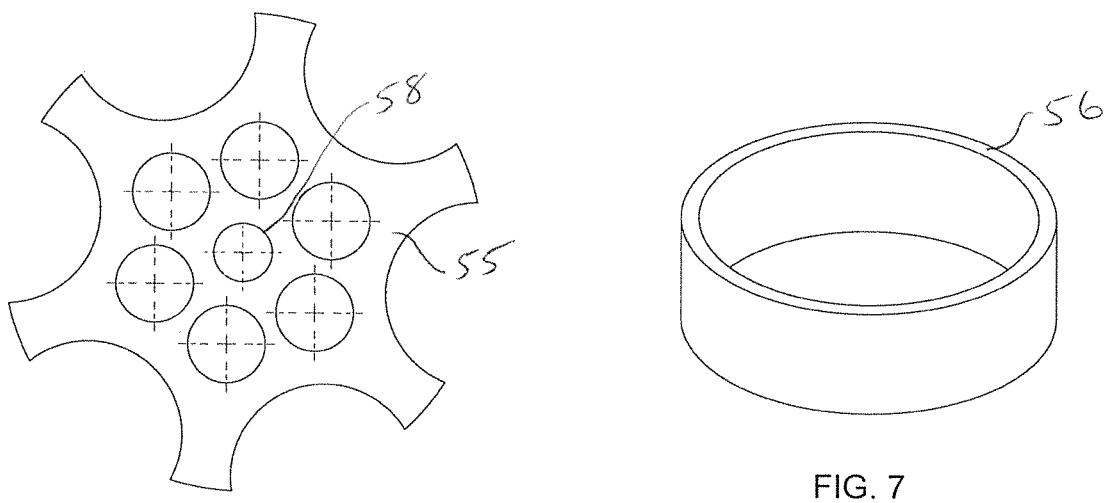
FIG. 6
FIG. 7

FILTER SCRAPER

BACKGROUND OF THE INVENTION

This invention relates generally to filter devices for sludge handling and, more particularly, to a method and apparatus for cleaning debris from filter cartridge surfaces.

Filter devices are commonly used to remove debris from liquids in, for example, various tooling, cutting, and/or grinding operations. Cleaning the filter cartridges, such as paper roll cartridges, has been difficult. Maintenance free filtration has been developed whereby dirty liquid (e.g., oil) is forced toward the center of each filter element and particles larger than, for example, one micron are trapped on the filter. Rather than being replaced, the filter elements are cleaned automatically with compressed air applied in a reverse direction. The air dislodges the debris on the outer filter surfaces. The debris is then removed from a vessel containing the filter elements. Life expectancy of the filter elements is approximately 25,000 hours, however, this figure is often times greatly exceeded. There is a continuing need for improved cleaning of filtration systems to improve filtration and maximize filter lifetimes.

SUMMARY OF THE INVENTION

The invention provides an improved filter cleaning system. The method and apparatus of this invention use a scraper along the length of a filter element to remove surface sludge or other debris. The scraper desirably operates in conjunction with back flushing of air or liquid to further clean the filter element.

The general object of the invention can be attained, at least in part, through a filter apparatus with one or more filter elements each including a filter body with an external surface enclosing a filter passage. The filter body includes a first end, an opposite second end, and a longitudinal length extending between the first end and the second end. A scraper element is disposed about a corresponding external surface and configured to move along the longitudinal length of the corresponding filter body. Each scraper element includes an inner circumference and an inner shape matching an outer peripheral size and shape of the external surface of the filter body so that the scraper element removes deposits on the external surface of the filter body as it moves.

The invention further includes a filter apparatus with a plurality of filter elements arranged spaced apart and parallel in a filter array, each of the filter elements includes an external surface with a longitudinal length, and a scraper device including a plurality of scraper elements interconnected in a matching scraper array. Each of the scraper elements is disposed about the external surface of, and configured to move and remove deposits along the longitudinal length of, a corresponding one of the filter elements.

The scraper array can include a central threaded nut opening disposed on a screw thread of a central rotational screw for movement along the filter bodies via screw rotation. A hose including a nozzle can be connected to the scraper array and configured to discharge a fluid into a screw thread of the rotational screw, wherein the fluid clears debris from the screw thread.

The invention further includes a method of maintaining or cleaning a filter apparatus by removing deposits from a filter element via running a scraper element along a longitudinal length of an external surface of the filter element. The scraper element has an inner size and shape corresponding to an outer peripheral size and shape of the filter element along the longitudinal length. Additionally or alternatively, injecting air into the filter apparatus can be used to create air bubbles that move along the filter element to loosen or remove a portion of the deposits.

Other objects and advantages will be apparent to those skilled in the art from the following detailed description taken in conjunction with the appended claims and drawings.

BRIEF DESCRIPTION OF THE DRAWINGS

FIG. 5 shows a scraper array according to one embodiment of this invention.

FIG. 6 shows a central disk of the scraper array of FIG. 5.

FIG. 7 shows a connector ring of the scraper array of FIG. 5.

DETAILED DESCRIPTION OF THE INVENTION

Figure 1:
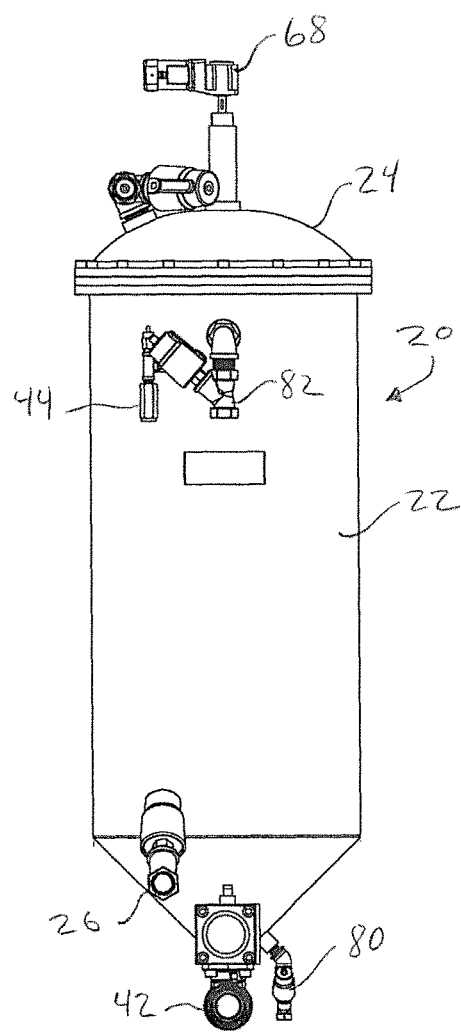
FIG. 1 shows a front view of a filter vessel according to one embodiment of this invention.

FIGS. 1-4 show a filter vessel 20 according to one embodiment of this invention. The filter vessel 20 is designed to be combined with other like filter vessels in a centralized and expandable filter system including, for example, a system housing enclosing or containing the vessels, pre-filters, delivery pumps, chillers, sludge handling/reclamation devices, and/or other devices and connection hoses, etc. The filter vessel 20 is useful for filtering operational liquids (e.g., water or oil) from, for example, cutters, grinders, EDM machines, and other finishing machines. The vessel will be described below with reference to an oil filter.

The filter vessel 20 includes a vessel housing 22 with a vessel top 24 removably attached thereon. The vessel housing 22 includes a dirty oil inlet 26 for receiving the dirty oil to be filtered. The dirty oil passes through filter elements 30 and out through clean oil outlet 28.

The filter vessel 20 includes a plurality of filter elements 30, arranged parallel in a longitudinal direction and spaced apart in a filter array. Each filter element 30 includes a cylindrical or tubular filter body 32 with an external surface 34 enclosing a filter passage 35. The filter body 32 includes a first end 36, which can be threaded to attach to the vessel 20, such as via a filter attachment plate 25 disposed between the vessel housing 22 and vessel top 24. The filter body 32 further includes an opposite second end 38, and a longitudinal length extending between the first end 36 and the second end 38 and parallel to a longitudinal axis of the vessel 20.

Any suitable filter element can be used according to this invention. A preferred filter element is referred to as an 'edge filter' and is formed by arranging a plurality of generally annular, thin filter disks stacked around a radially pervious and hollow core. The individual filter disks can be held together by upward force provided by a spring or equivalent at the second end 38. Slots between the filter disks allow passage of the liquid to be filtered, and debris as low as 1 micron are caught on the edge of the compressed disks. One exemplary edge filter is disclosed in U.S. Pat. No. 4,664,814, herein incorporated by reference.

The filter vessel 20 further includes a maintenance system that allows back flushing of the filter elements 30 to remove sludge or other debris from the external surfaces 34. The filter vessel 20 includes air inlet 40 for introducing compressed air into the filter passages 35. The compressed air travels in a reverse direction from the dirty oil and loosens the debris to fall within the vessel 20 to allow for removal and reclamation or disposal through bottom drain outlet 42. A further drain air inlet 44 can be opened to promote draining.

The invention further provides a scraper element to scrape sludge or debris off the external surface(s) of the filter body(ies). As show in FIGS. 2 and 4, a scraper device 50 includes scraper elements 52 in an array corresponding to the array of filter elements 30. Each scraper element 52 extends around and in contact with the external surface 34 of a corresponding filter body 32. Each scraper element 52 has an inner circumference and an inner shape that correspondingly matches an outer peripheral size and shape of the external surface 34 of the corresponding filter body 32. As illustrated, the scraper elements 52 and filter bodies 32 are circular and cylindrical, but other shapes can be used, such as any matching polygon.

FIG. 5 illustrates a scraper device 50 according to one embodiment of this invention. The scraper device 50 includes the scraper elements 52 interconnected in a scraper array corresponding to the filter array shown in FIG. 4. In FIG. 5, the scraper elements 52 are disposed in a plurality of nested ring structures, each separated and connected to an adjacent ring of elements 52 by a connector ring 56, such as separately shown in FIG. 7. The scraper elements 52 can be integrally formed with the connector rings 56 or connected thereto by, for example, welds or fasteners. Various and alternative sizes, shapes, numbers, and configurations are available for the scraper elements, the ring structures, and the connector rings, depending on the corresponding filter and vessel configuration. For example, the filter and scraper arrays can be in one or more linear rows. The individual scraper elements can also be interconnected by any other suitable structure, such as connecting rods or arms extending between adjacent elements.

Figure 2:
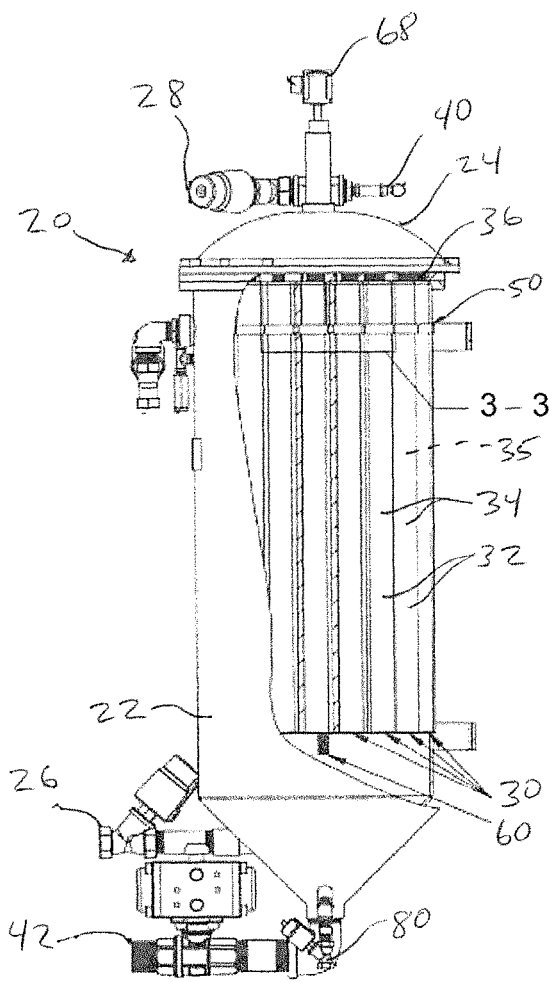
FIG. 2 shows a partial sectional side view of the filter vessel of FIG. 1.
Figure 4:
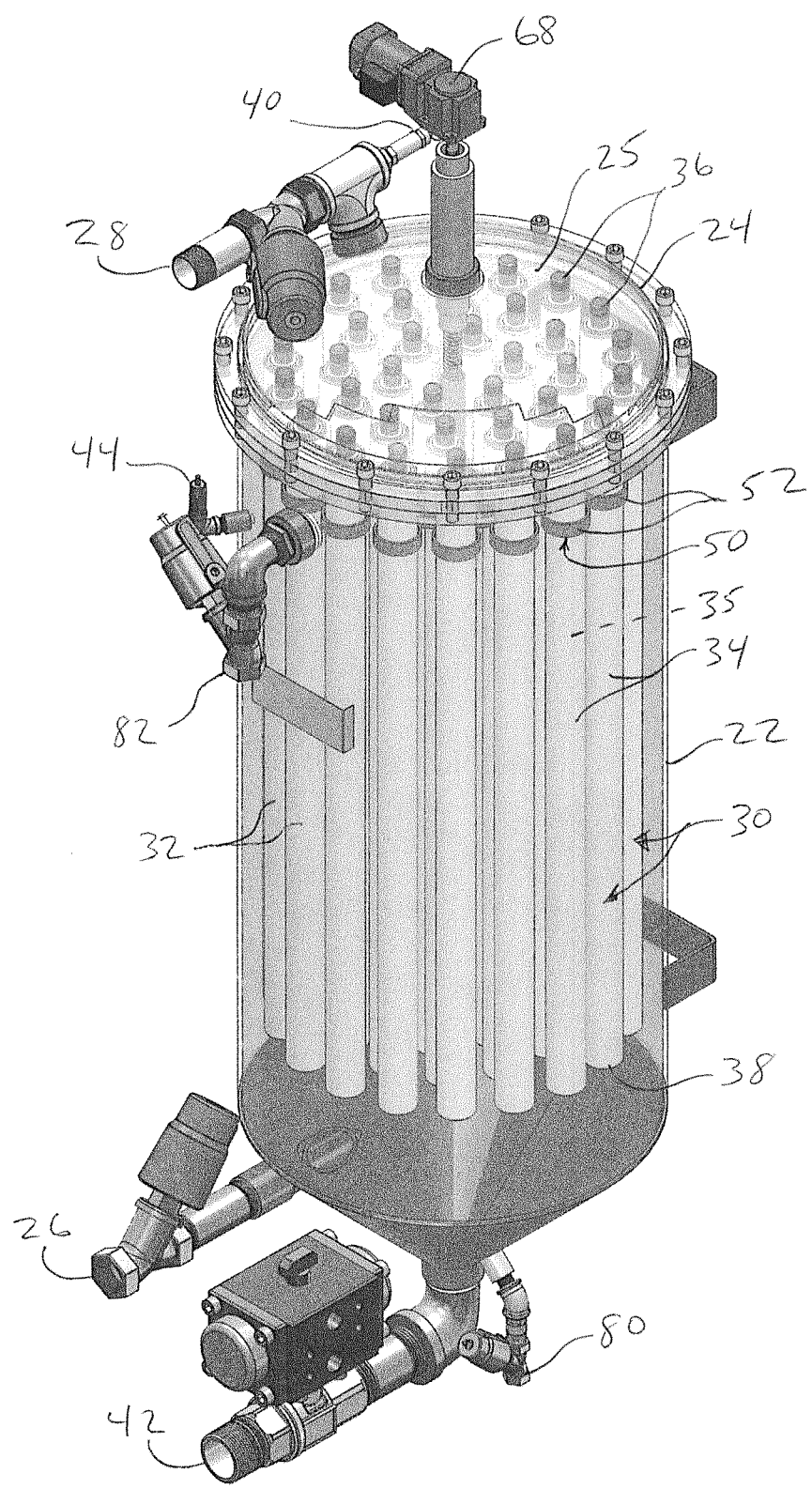
FIG. 4 is a perspective view of the filter vessel of FIG. 1 showing internal components.

The scraper device 50 is configured to move in the longitudinal direction, up and down in FIGS. 2 and 4, along the array of filter elements 30 to scrape and remove deposits from the external surface 34. This scraping can be performed before, during, or after the back-flushing described above. The scraper device of this invention is connected to and moved by a linear movement device that extends in or otherwise moves the scraper device in the longitudinal direction along the filter bodies.

In FIGS. 2 and 4, the linear movement device is embodied as a rotational screw 60 arranged and extending parallel to the filter elements 30. The scraper device 50 comprises a threaded center opening 58, such as a central threaded nut, in threaded combination with a thread of the screw 60. The threaded opening 58 is disposed on a screw thread of the rotational screw 60 such that rotation of the rotational screw 60 via two-direction motor 68 moves the scraper array along the filter elements 30. As shown in FIG. 5, the threaded opening 56 can be formed in a central disk 55, shown separately in FIG. 6. Any suitable rotational screw can be used, such as a lead screw, ball screw, or an acme screw.

Figure 3:
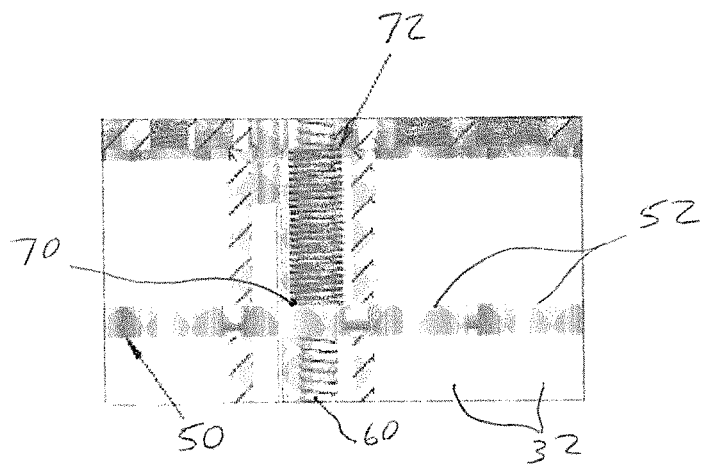
FIG. 3 is an exploded view of the section identified in FIG. 2.

In embodiments of this invention the rotational screw 60 includes a thread cleaning device including a nozzle 70 connected to the scraper array in a direction aimed at the thread, thereby configured to discharge a fluid into a screw thread of the rotational screw to clears debris from the screw thread. The nozzle can be above or below the scraper device 50, or multiple nozzles can be used to ensure clear threads in both directions. As shown in FIG. 3, the nozzle 70 receives a clearing fluid (e.g., air or oil) through a hose 72 that is coiled around the screw 60, whereby the coil expands and retracts in the longitudinal direction about the screw 60 as the nozzle 70 travels with the scraper device 50.

Embodiments of this invention include an lower air inlet 80 configured to inject air bubbles into the vessel housing 22 and in contact up and along the external surface 34 of each of the filter elements 30 to loosen or remove a portion of the deposits. The injected air can be vented through opening outlet 82. The bubble-loosening can be done separately or along with the other functions described above, such as before or during the back flushing and/or scraping functions. Desirably, the bubbles loosen the deposits before vessel draining and reverse flushing with low viscosity oil and/or air from inside the filter elements.

Thus, the invention provides a filter apparatus with integrated filter cleaning systems to maximize filtration and filter life. The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A filter apparatus, comprising:
    a filter element including a filter body with an external surface enclosing a filter passage, the filter body including a first end, an opposite second end, and a longitudinal length extending between the first end and the second end;
    a scraper element disposed about the external surface and configured to move along the longitudinal length of the filter body;
    a rotational screw in combination with the scraper element and extending parallel to the longitudinal length of the filter body, wherein rotation of the rotational screw moves the scraper element along the longitudinal length of the filter body; and
    a hose including a nozzle configured to discharge a fluid into a screw thread of the rotational screw, wherein the nozzle is attached to the scraper element and configured to move with the scraper element and the fluid clears debris from the screw thread.

2. The filter apparatus of claim 1, wherein the scraper element is configured to remove deposits on the external surface of the filter body.

3. The filter apparatus of claim 1, wherein the scraper element comprises an inner circumference including an inner shape matching an outer peripheral shape of the external surface of the filter body.

4. The filter apparatus of claim 1, wherein the scraper element extends around and in contact with the external surface of the filter body.

5. The filter apparatus of claim 1, further comprising a second filter element and a second scraper element disposed about a second external surface of the second filter element, wherein each of the scraper element and the second scraper element move together in response to rotation of the rotational screw.

6. The filter apparatus of claim 1, further comprising:
an array of filter elements arranged parallel in a longitudinal direction; and
a scraper device configured to move in the longitudinal direction along the array of filter elements, wherein the scraper device comprises a plurality of scraper elements each disposed about and configured to move along a corresponding one of the filter elements.

7. The filter apparatus of claim 6, further comprising the rotational screw arranged parallel to the filter elements, wherein the scraper device comprises a threaded nut fixed between the plurality of scraper elements and in threaded combination with a thread of the rotational screw.

8. The filter apparatus of claim 1, further comprising a filter housing enclosing the filter element and the scraper element, the filter housing including:
a first inlet and a first outlet for passing a fluid through the filter housing and the filter element; and
an air inlet configured to inject air bubbles into the filter housing and in contact with the external surface of the filter body.

9. A filter apparatus, comprising:
a plurality of filter elements arranged spaced apart and parallel, each of the filter elements including an external surface with a longitudinal length;
a scraper array including a plurality of scraper elements, each of the scraper elements disposed about the external surface of, and configured to move and remove deposits along the longitudinal length of, a corresponding one of the filter elements;
a rotational screw in combination with the scraper array and extending parallel to the longitudinal length of each of the filter elements, wherein rotation of the rotational screw moves the scraper array along the filter elements; and
a hose including a nozzle connected to the scraper array and configured to discharge a fluid into a screw thread of the rotational screw, wherein the fluid clears debris from the screw thread.

10. The filter apparatus of claim 9, wherein the filter elements are arranged in a filter array, and each of the scraper elements are interconnected in the scraper array corresponding to the filter array.

11. The filter apparatus of claim 10, wherein the filter array comprises more than one ring configuration of filter elements and the scraper array comprises the scraper elements in more than one corresponding ring configurations.

12. The filter apparatus of claim 9, wherein the scraper array comprises a central threaded nut disposed on a screw thread of the rotational screw.

13. The filter apparatus of claim 9, further comprising a filter housing enclosing the filter element and the scraper element, the filter housing including:
a first inlet and a first outlet for passing a fluid through the filter housing and the filter element; and
an air inlet configured to inject air bubbles up and along the external surface of each of the filter elements to loosen or remove a portion of the deposits.

14. A method of maintaining or cleaning a filter apparatus according to claim 1, the method comprising:
removing deposits from a filter element by running a scraper element along a longitudinal length of an external surface of the filter element, wherein the scraper element has an inner shape corresponding to an outer peripheral shape of the filter element along the longitudinal length.

15. The method of claim 14, further comprising injecting air into the filter apparatus to create air bubbles that move along the filter element to loosen or remove a portion of the deposits.

16. The filter apparatus of claim 1, further comprising a filter vessel including a vessel top and vessel bottom, and enclosing a plurality of filter elements, wherein the rotational screw is centered within the filter vessel and extends from the vessel top.

17. The filter apparatus of claim 16, further comprising a two-direction motor at the vessel top, and in combination with the rotational screw.

18. The filter element of claim 16, further comprising an array of filter elements and a corresponding array of scraper elements, the array of filter elements arranged about the centered rotational screw, and the array of scraper elements disposed around a central threaded opening that travels along the rotational screw.

* * * * *